United States Patent
Elie et al.

(10) Patent No.: US 7,016,776 B2
(45) Date of Patent: Mar. 21, 2006

(54) MAGNETIC POWDER TORQUE TRANSFER CLUTCH FOR CONTROLLING SLIP ACROSS A DIFFERENTIAL MECHANISM

(75) Inventors: Larry Elie, Ypsilanti, MI (US); John Ginder, Plymouth, MI (US); Clay Maranville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

(21) Appl. No.: 10/804,307

(22) Filed: Mar. 19, 2004

(65) Prior Publication Data

US 2005/0209761 A1 Sep. 22, 2005

(51) Int. Cl.
*G06F 17/00* (2006.01)
*G06F 19/00* (2006.01)

(52) U.S. Cl. ............... 701/67; 701/41; 701/79; 701/84; 701/88; 477/903

(58) Field of Classification Search ............ 701/41, 701/67, 72, 79, 84, 88; 192/3.58; 477/35, 477/903, 904

See application file for complete search history.

(56) References Cited

U.S. PATENT DOCUMENTS

| 5,270,930 | A | * | 12/1993 | Ito et al. .................... 701/69 |
| 5,845,753 | A | | 12/1998 | Bansbach ................ 192/21.5 |
| 5,915,513 | A | | 6/1999 | Isley, Jr. et al. ............. 192/35 |
| 6,334,832 | B1 | | 1/2002 | Heravi et al. ............... 475/85 |
| 6,412,618 | B1 | | 7/2002 | Stretch et al. ............... 192/35 |
| 6,428,441 | B1 | | 8/2002 | Hunt ...................... 192/21.5 |
| 6,530,460 | B1 | | 3/2003 | Gradu ...................... 192/35 |

* cited by examiner

*Primary Examiner*—Gertrude A. Jeanglaude
(74) *Attorney, Agent, or Firm*—David B. Kelley; MacMillan, Sobanski & Todd

(57) ABSTRACT

A control for a differential including magnetic powder torque transfer clutch for controlling slip across the differential mechanism. The clutch includes a first element driveably connected to a first control shaft, a second element driveably connected to the second output shaft, chamber bounded by the first and second elements, magnetic powder located in the chamber; and an elecromagnetic coil producing a magnetic field of variable strength passing through the chamber and magnetic powder and changing a capacity of the clutch to transmit torque between the first and second control shafts as the field strength changes.

32 Claims, 2 Drawing Sheets

MAGNETIC POWDER TORQUE TRANSFER CLUTCH FOR CONTROLLING SLIP ACROSS A DIFFERENTIAL MECHANISM

BACKGROUND OF THE INVENTION

1. Field of the Invention

This invention relates to the control of torque transfer in a differential mechanism having a magnetic powder differential lock providing limited and controllable slip.

2. Background of the Invention

In automotive applications, two or more wheels typically drive the vehicle. Since each of the driven wheels takes a different path length, especially around turns or over uneven road surfaces, the drive wheels must not be forced to drive at exactly the same rotational speed. The automotive differential solves the problem of wheel contact and path length by sharing torque equally on both sides of a gear set, with the driven speed determined only by the torque provided. The negative consequence of torque sharing is that under conditions of limited traction, no wheel is given any more torque than the wheel with the least traction. The generally accepted solution for improved traction is differential braking or lockup, or a limited slip differential. There are a number of problems with these techniques. This invention provides an improved embodiment of a controllable differential lock with controllable slip.

A differential brake or lock allows the operator of the vehicle to intentionally lock the rotational speed of the wheels of the vehicle together by closing a friction brake tied to the axle shaft of each wheel. When the lock is engaged, the differential is no longer operative and the wheels all turn at the same speed. Control is typically up to the vehicle operator, and a significant torque pulse usually accompanies engagement of the differential lock. This type of device is common on agricultural and industrial off road equipment.

A limited slip differential automates control of the lock up of a differential lock. Typically wheel spin is sensed mechanically, by shearing a fluid, or electronically, by wheel or shaft speed sensors. The brake is applied mechanically, by pressure, or electrically, by locking up the axles of the vehicle utilizing a differential lock. Operator intervention is not required. A significant torque pulse still usually accompanies the engagement. In the case of a fluid lock, significant energy must also be dissipated as heat. Individual wheel braking, to maintain traction control, also generates significant heat because it is applied with respect to the chassis.

In all these cases, when a wheel spins, the axle wind-up, i.e., energy stored in compliance of the member, is released suddenly. Finally, locking clutches are not typically used in front-drive vehicles, and never for torque bias ratios greater than 2.5:1 because of torque-steer problems.

Magnetorheological (MR) clutches and brakes enable electrical control of torque transfer and rotational slip. These clutches and brakes typically use MR fluids, which are slurries of 2 to 5 micron particles suspended in oil. As magnetic fields are applied to the fluid, the particles tend to form chains, which are capable of carrying torque proportional to the magnetic field. Magnetic powder clutches and brakes are fluid-less analogs of MR clutches and brakes. The magnetic portion of their design is nearly identical to MR fluid devices, but since air is their fluid medium, inexpensive baffles can be used in place of seals. The magnetic particles are typically magnetic, martensitic stainless steel for corrosion resistance, with 10–100 micron diameters. Other advantages include engagement can be made at any speed, the powder is relatively tolerant of slip, and it can operate at very high temperature, roughly 500° C.

The use of a MR fluid clutch to control the locking of a differential is disclosed in U.S. Pat. No. 5,845,753. Its implementation is daunting, because the entire wheel torque of the vehicle (on the order of 1000 N-m) is carried across a MR fluid coupling. In order to transfer that magnitude of torque, the device would have to be large and very heavy. At high differential speeds between axles, the particles would tend to disperse away from the center of the multi-disc clutch due to centrifugal force. This tendency to centrifugate would severely and irreversibly reduce the torque carrying capacity of the clutch.

U.S. Pat. No. 5,915,513 attempts to overcome packaging problems by using a multi-disc, MR clutch to control a ball-ramp clutch, which performs the locking. Control is by dedicated sensors. Again, engagement would not be possible at high differential shaft speeds. Similarly, U.S. Pat. No. 6,428,441 controls a ball-ramp based on targeted differential speed. U.S. Pat. No. 6,412,618 affects a similar fix with the enhancement of a magnetic powder brake.

U.S. Pat. No. 6,334,832 overcomes the torque carrying capacity requirements by gearing up each side of the differential significantly to directly drive an MR clutch. Shaft speed is higher, but torque is lower, so package size, weight, and cost are substantially reduced. This patent describes a disc-geometry clutch, with all of the relative speed engagement issues raised above, but multiplied by the higher rotational speed. It is unlikely that engagement at automotive axle speeds would be possible.

SUMMARY OF THE INVENTION

The present invention provides a magnetic powder clutch, which controllably adjusts the magnitude of torque transmitted by a clutch between two rotating shafts. Alternative embodiments may use magnetorheological or electrorheological fluids in concentric-cylinder clutches or brakes.

An advantage of the invention is high long-term durability of the clutch because aggregate engagement time of the clutch is short and there is little wear of clutch surfaces. Torque reduction in the mechanism can be accomplished using gears, chains, belts, higher speed gearing. The mechanism is simple and employs an inexpensive control that relies on the appropriate speed ratio of axle half shafts.

The torque required after gearing-up both front and rear axles is readily realizable at low electrical power expenditure, size and weight. In addition, the clutch uses concentric cylinders, which allows engagement at essentially any automotive axle speed. It is well known that centrifugation is not a problem with this geometry.

Because the energy dissipated by the clutch is the product of the relative rotational rate of the two clutch members and the torque produced, heat buildup is low and completely manageable at the desired low slip rates. Heat dissipation due to frictional contact and slip across the clutch is low.

In realizing these and other advantages, a method according to the present invention controls wheel slip across a differential mechanism of a motor vehicle having a vehicle speed, a steering angle and a steering direction, the differential mechanism including two rotating output shafts driveably connected to the wheels and connectable by a clutch that is activated by a magnetic field of variable strength to change a torque capacity of the clutch. The method includes comprising the steps of determining the current driveshaft speed, the magnitude and the direction of the current steering angle; determining a target speed of the output shafts that corresponds to the current driveshaft speed, steering angle and steering direction; determining the speeds of the output shafts; comparing the speeds of the output shafts and the target speeds to determine whether wheel slip is present; and adjusting the magnitude of the field strength to increase the torque capacity of the clutch and control the speed of the rotating shafts such that wheel slip is reduced.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
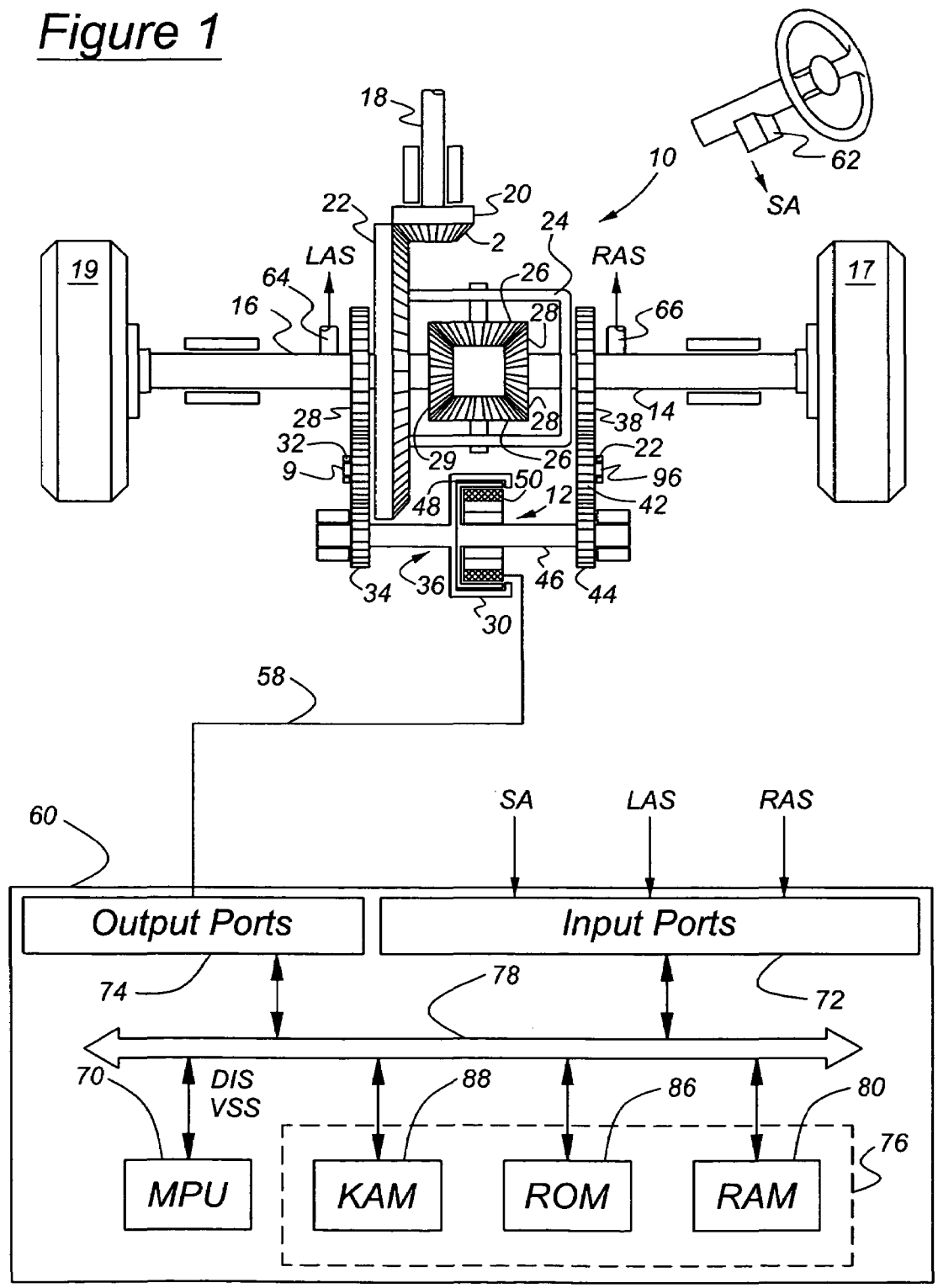
FIG. 1 is a schematic illustration of a rear wheel drive limited slip differential gearset controlled by a magnetic powder clutch.

Referring now to the drawings, there is illustrated in FIG. 1 a schematic diagram of a rear wheel drive, limited slip differential mechanism 10 and a gearset controlled by clutch 12, which is actuated by selective creation of a magnetic field operating on magnetic powder contained in the clutch. The clutch and its associated control determine the relative magnitudes of torque supplied to right-hand and left-hand axle shafts 14, 16. All shafts in this design are supported rotatably by appropriately sized bearings.

An engine or another power source (not shown) is driveably connected to a transmission, which produces a range of gear ratios some of which increase the speed and reduce the torque at the transmission output relative to those of the engine output. Some of the gear ratios produced by the transmission decrease the speed and increase the torque at the transmission output relative to those of the engine output.

The transmission output is driveably connected to and transmitted by a driveshaft 18 through a bevel pinion gear 20, which meshes with a ring gear 22, creating a 90-degree change in the direction of angular momentum. The ring gear 22 is secured to a pinion carrier 24 surrounding a differential gearset. Bevel pinions 26, supported on pinion carrier 24 for rotation about the axis of the axle shafts 14, 16, are in continuous meshing engagement with bevel side gears 28, 29, secured to axle 14 and 16, respectively. The differential gearing operates such that when the car is moving in a straight line, either forward or rearward, the left axle 16 and right axle 14 have the same speed. In this condition, there is no wheel or tire slip, and the speeds of the side gear 29, bevel pinions 26, and right side gear 28 are equal.

When the vehicle turns at a constant angle from the straight direction, the wheel at the outside of the turn increases in speed, and the inner wheel decreases in speed, such that the average speed of the vehicle does not change from the straight-line speed, otherwise the wheels will experience slip. For a given angular velocity of the pinion carrier 24, if the rotational speed of the left axle 16 increases, then the rotational speed of the right axle 14 decreases a commensurate amount.

In normal operation of the vehicle when both wheels have reasonably high coefficient of friction with the ground, there will be no slippage of either tire. Torque at the axles 14, 16 will be converted almost entirely to vehicle movement. However, if the left axle 16 is on a surface having a high coefficient of friction such as pavement, and the right axle 14 is on surface having a low coefficient of friction such as ice, then the left axle 16 will have no angular velocity and the right axle will spin at twice the speed of the pinion carrier 24. This occurs because the torque at the left axle 16 and the right axle 7 must always be equal. Since the left shaft 16 is not rotating, it has no torque other than that caused by friction losses due to gear meshing. Therefore, the right axle shaft 14 also has virtually no torque, and the vehicle will not move.

In the condition described with the vehicle is not moving, a device to allow the differential to transfer driveshaft angular velocity to both the left and right axles in appropriate proportions, depending on steering angle, is desired. A gear train is used to transfer high torque and low speed at the axles 14,16 to high speed and low torque in the magnetic powder clutch 12. A left axle gear 28 is driveably connected to an outer shell 30, which surrounds the magnetic powder clutch 12. This drive connection is produced by a set of meshing gears 32, 34 and a shaft 36, to which gear 34 is secured. Alternatively a sprocket wheel or pulley, secured to axle 16, and a sprocket wheel or pulley, secured to shell 30, are engaged by a drive belt or a drive chain so that the speed of shell 30 is appropriate increased. The magnitude of the required speed increase will depend on the operating characteristics of the vehicle and of the magnetic powder clutch 12.

A right axle gear 38 is driveably connected to the inner shell 40, which surrounds the magnetic powder clutch 12. This drive connection is produced by a set of meshing gears 42, 44 and a shaft 46, to which gear 44 is secured. Alternatively a sprocket wheel or pulley, secured to axle 14 and a sprocket wheel or pulley, secured to shell 38, are engaged by a drive belt or a drive chain. In either case, the gear ratio of the right side matches that of the left side. When clutch 12 is fully engaged, the right and left axle shafts 14, 16 are geared together, or otherwise driveably connected, through a fixed connection, and they are forced to turn at the same speed. By varying the degree of engagement of clutch 12, the magnitude of slip, or differential speed across the clutch, the speed of axle shafts 14, 16 can be controlled so that they rotate at an appropriate speed based on input from a steering indicator.

Figure 2:
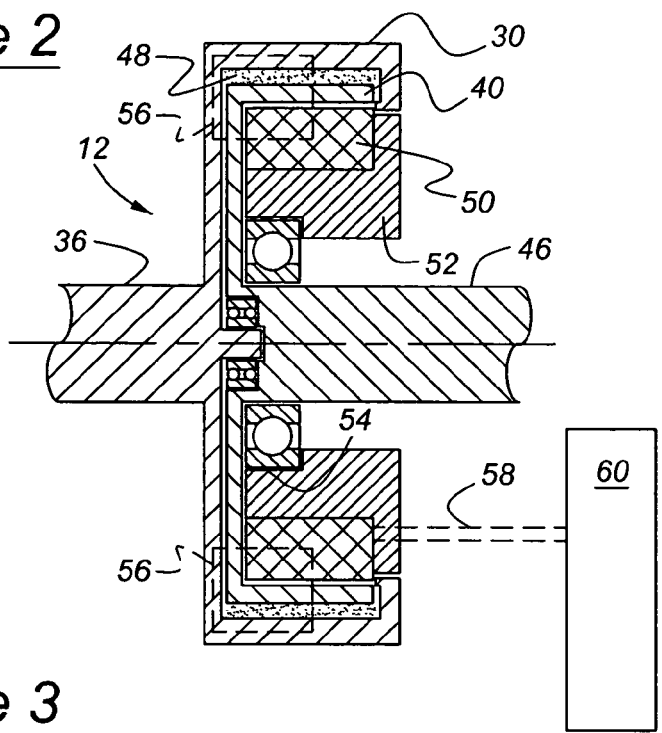
FIG. 2 schematically shows the clutch in more detail.

FIG. 2 illustrates clutch 12 in more detail. The outer shell 30 of the clutch is connected by shaft 36 to, and rotates synchronously with the left axle 16. Shell 30 is constructed of low-carbon steel or some other material having a high saturation magnetization and low residual magnetization. The inner shell 40 of the clutch is connected through shaft 46 to, and rotates synchronously with the right axle 14. Shell 40 is also constructed of steel or some other material having a high saturation magnetization.

In order for the two axles 14, 16 to rotate at equal speed or with an appropriate differential speed, the two shells 30, 40 are coupled together using magnetic powder 48, which is contained in a narrow, confined gap between the two shells. The magnetic powder has the property of being sensitive to a magnetic field. When the powder is not magnetized, the powder is urged by centrifugal force into contact with the inner surface of the outer shell 30 and out of contact with the inner shell 40. In this condition, the powder fills a fraction of the thickness of the gap. A coil of electrically conductive wire 50 is wound around a core 52 of steel or other ferromagnetic material, supported on a bearing 54 and secured to the inner shell 40. In this way, the bearing 54 acts as a centering device to keep the gap between the inner and outer shells 40, 30 constant. Core 52 is fixed to a mechanical ground such as the differential case. When a magnetic field is produced, magnetic flux lines 56 are generated that pass perpendicularly through the gap between the two shells 30, 40.

The magnetic field is strong enough to overcome the effect of the centrifugal force on the powder, and the field creates chains of magnetic powder along the flux lines between the inner surface of the outer shell 30 and outer surface of the inner shell 40. The chains have a yield strength that is proportional to the strength of the magnetic field. A mechanical force greater than the magnetic force is required to pull the chains of magnetic powder apart and allow the inner and outer shells to rotate at different speeds. Those who are skilled in the art can easily derive the equations that relate the variables necessary to perform this function.

The electromagnet 50 is supplied with electric current from a source of d. c. electric power through a line 58. A variable magnetic field 56 can be produced alternatively by a moveable permanent magnet 50 or by a combination of a permanent magnet and an electromagnet, which biases the magnetic field 56 to control its strength. The current is supplied in the appropriate magnitude by a controller 60, which monitors the angular disposition of the steering wheel, or that the steered vehicle wheels, or the position or displacement of another component such as a tie rod, which correctly represents the steering angle through which the vehicle is turning with respect to a reference angle, preferably zero degrees, the straight direction. The controller 60 is supplied with output produced by various sensors 62, 64, 66, which, respectively, produce signals representing the steering angle SA, speed of the left axle LAS, and speed of the right axle RAS. Wheel speed sensing can be obtained from anti-lock brake system (ABS) wheel speed sensors located at the wheels, or from dedicated sensors.

Controller 60 is preferably a microprocessor-based controller, which provides integrated control of the engine 14, transmission, and vehicle dynamics. Controller 60 includes a microprocessor 70 in communication with input ports 72, output ports 74, and computer readable media 76 via a data/control bus 78. Computer readable media 76 may include various types of volatile and nonvolatile memory, such as random access memory (RAM) 80, read-only memory (ROM) 82, and keep-alive memory (KAM) 84. These functional descriptions of the various types of volatile and nonvolatile storage may be implemented by any of a number of known physical devices including, but not limited to EPROMs, EEPROMs, PROMS, flash memory, and the like. Computer readable media 76 include stored data representing instructions executable by microprocessor 70 to implement the method for controlling the differential 10 according to the present invention.

Figure 3:
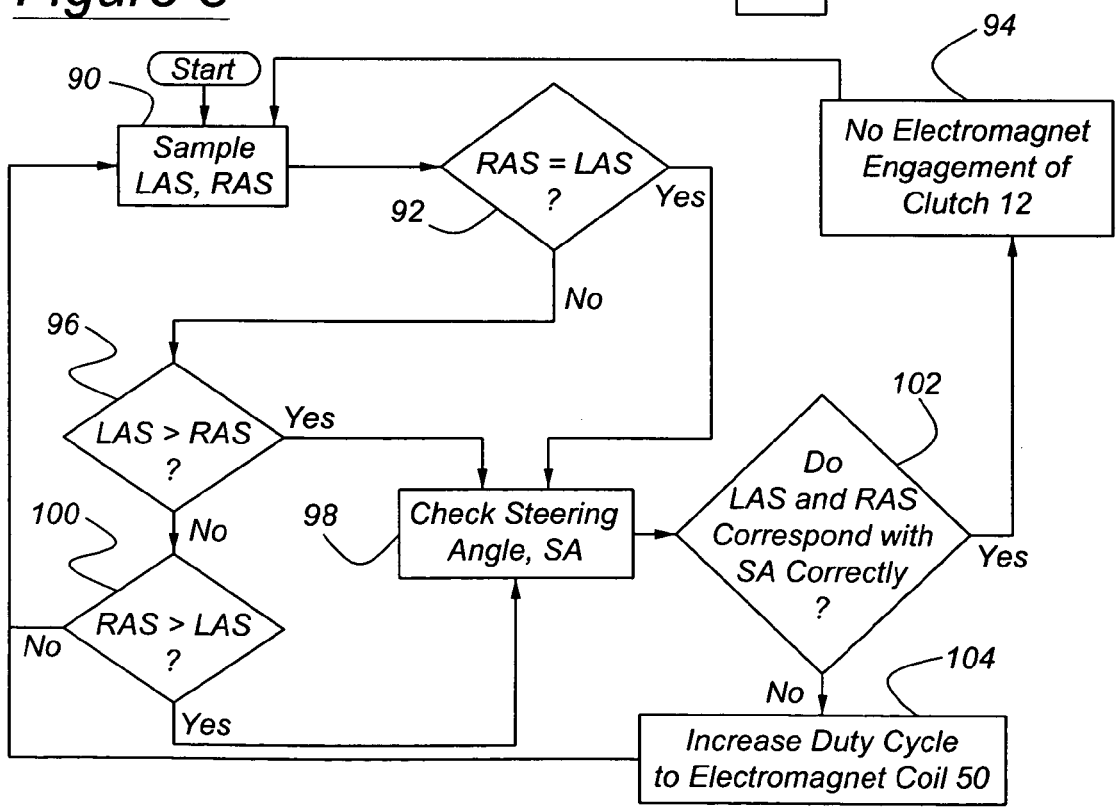
FIG. 3 is a control strategy for monitoring and controlling the relative wheel speeds of the powertrain of FIG. 1

FIG. 3 illustrates a control strategy for monitoring and controlling the relative wheel speeds by controlling the degree of engagement of clutch 12 and the resultant slip across clutch 12 required to control wheel slip. The structure and operation of clutch 12 and principle of the control according to this invention are applicable also to AWD systems. The energized coil 50 creates a magnetic field 56, which causes the magnetic powder 48 to become magnetized and to act as either a slipping brake or lock-up clutch, by means of which the relative angular velocity of the axles 14, 16 is controlled. The controller 70 provides limited relative slip or complete engagement, called lock-up, of clutch 12, depending on the design requirements. The magnetic field 56 can be produced by either a constant field, or by pulsing the electromagnet coil 50 with a signal having a PWM duty cycle.

At step 90, controller 60 receives and stores in memory the current magnitude of the speeds produced by sensors 64 and 66. At 92, an inquiry is made to determine whether those speeds are equal. If that test is true, indicating that the vehicle is not turning, control passes to 98, where the current steering angle SA is sampled and the steering angle corresponding to the magnitudes of LAS and RAS is determined.

If the test at 92 is false, another inquiry is made at 96 to determine whether LAS exceeds RAS. If the result of test 96 is true, indicating a right turn is in progress, control passes to 98 where the current steering angle SA is sampled and the steering angle corresponding to the magnitudes of LAS and RAS is determined. If the result of test 96 is false, a test is made at 100 to determine if RAS is less than LAS. If the result of test 100 is true, indicating a left turn is in progress, control passes to 98 where the current steering angle SA is sampled and the steering angle corresponding to the magnitudes of LAS and RAS is determined. If test 100 is false, then continued execution of the control loop is terminated, and control passes to 90, where the loop is initialized and execution begins again.

If at 102 the controller 60 determines that, based on the magnitudes of LAS, RAS and SA, there is some wheel slippage occurring, the controller determines at 104 the required PWM duty cycle magnitude, or the magnitude of current to be supplied to coil 50, or the strength of the magnetic field, obtained by another method such as a permanent magnet or an electromagnet biased by a permanent magnet 50 to correct for wheel slippage and supplies the required duty cycle or magnitude of electrical current through leads 18 to coil 50 of the electromagnet. This duty cycle actuates clutch 12 by increasing the field strength, increasing the strength of the chains of thereby increasing the torque transmitting capacity of the clutch.

A preferred magnetic powder for use in clutch 12 is commercially available from Carpenter Powder Products of Bridgeville, Pa., U.S.A, through its business unit Anval Powder of Torshalla, Sweden. A preferred magnetic powder is in the form of gas-atomized, spherical particles of 410 low carbon stainless steel, the particles having a size in the range 1–250 microns.

Other ferromagnetic particles having particle sizes, metallurgical compositions, and morphologies outside these ranges are also possible candidates for changing the torque capacity of the clutch 12 and encompass other embodiments of this design.

Alternative materials for changing the torque capacity of the clutch 12 include magnetorheological and electrorheological fluids located in concentric-cylinder clutches or brakes.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling wheel slip across a differential mechanism of a motor vehicle having a steering angle and a steering direction, the differential mechanism driven by a driveshaft and having first and second rotating output shafts driveably connected to the wheels and connectable by a clutch that is activated by a magnetic field of variable strength to change a torque capacity of the clutch, the method comprising the steps of:

determining the steering angle and the direction of the steering angle;
determining a target speed of the output shafts that corresponds to a current driveshaft speed, steering angle and steering direction;
determining the speeds of the output shafts;
comparing the speeds of the output shafts and the target speeds to determine whether wheel slip is present; and
in response to the comparison, adjusting the magnitude of the field strength to increase the torque capacity of the clutch and control the speed of the output shafts such that the wheel slip is reduced.

2. The method of claim 1, further comprising the step of:
reducing the magnitude of torque to be transmitted by the clutch in comparison to the magnitude of torque carried by the two output shafts.

3. The method of claim 1, wherein the differential includes a first control shaft driven by the first output shaft, and a second control shaft driven by the second output shaft, the method further comprising the steps of:

locating the clutch in a torque path between the first and second control shafts such that the first and second control shafts are connectable by the clutch;
reducing a magnitude of torque transmitted to the first control shaft in comparison to a magnitude of torque carried by the first output shaft; and
reducing a magnitude of torque transmitted to the second control shaft in comparison to a magnitude of torque carried by the second output shaft.

4. The method of claim 1, wherein the step of adjusting the magnitude of the field strength, further includes the steps of:

locating the clutch in a torque path between the first and second output shafts such that the first and second output shafts are connectable by the clutch;
placing magnetic powder in a space located in the clutch in the torque path between the first output shaft and second output shaft such that a magnetic field passes through the magnetic powder;
producing a variable torque capacity through the clutch between the first and second output shafts by adjusting the magnitude of the magnetic field.

5. The method of claim 1, wherein the step of adjusting the magnitude of the field strength, further includes the steps of:

producing electric current in the coil from a PWM signal having a variable duty cycle whose magnitude produces a reduction in wheel slip.

6. The method of claim 1, further comprising the step of:
locating a coil in the clutch with respect to the location of the magnetic powder such that a magnetic field passes through the magnetic powder; and
wherein the step of adjusting the magnitude of the field strength further includes the step of producing electric current in the coil from a source of D.C. electric power whose magnitude produces a reduction in wheel slip.

7. The method of claim 1, wherein the step of adjusting the magnitude of the field strength, further includes the step of:
adjusting a moveable permanent magnet whose location produces a reduction in wheel slip.

8. A method for controlling wheel slip across a differential mechanism of a motor vehicle having a steering angle and a steering direction, the differential mechanism driven by a driveshaft and having first and second rotating output shafts driveably connected to the wheels and connectable by a clutch that is activated by a magnetic field of variable strength to change a torque capacity of the clutch, the method comprising the steps of:

determining the steering angle and the direction of the steering angle;
determining a target speed of the output shafts that corresponds to the current driveshaft speed, steering angle and steering direction;
determining the speeds of the output shafts;
reducing the magnitude of torque to be transmitted by the clutch in comparison to the magnitude of torque carried by the first and second output shafts;
comparing the speeds of the output shafts and the target speeds to determine whether wheel slip is present; and
in response to the comparison, adjusting the magnitude of the field strength to increase the torque capacity of the clutch and control the speed of the output shafts such that the wheel slip is reduced.

9. The method of claim 8, wherein the differential includes a first control shaft driven by the first output shaft, and a second control shaft driven by the second output shaft, the method further comprising the steps of:

locating the clutch in a torque path between the first and second control shafts such that the first and second control shafts are connectable by the clutch;
reducing a magnitude of torque transmit to the first control shaft in comparison to a magnitude of torque carried by the first output shaft; and
reducing a magnitude of torque transmit to the second control shaft in comparison to a magnitude of torque carried by the second output shaft.

10. The method of claim 8, wherein the step of adjusting the magnitude of the field strength, further includes the steps of:

locating the clutch in a torque path between the first and second output shafts such that the first and second output shafts are connectable by the clutch;
placing magnetic powder in a space located in the clutch in the torque path between the first output shaft and second output shaft such that a magnetic field passes through the magnetic powder;
producing a variable torque capacity through the clutch between the first and second output shafts when the coil is energized.

11. The method of claim 10, wherein the step of adjusting the magnitude of the field strength, further includes the steps of:

locating the clutch in a torque path between the first and second control shafts such that the first and second control shafts are connectable by the clutch;
placing magnetic powder in a space located in the clutch in the torque path between the first output shaft and second output shaft;
locating a coil in the clutch with respect to the location of the magnetic powder such that a magnetic field passes through the magnetic powder; and
producing a variable torque capacity through the clutch between the first and second control shafts when the coil is energized.

12. The method of claim 8, wherein the step of adjusting the magnitude of the field strength, further includes the steps of:

producing electric current in the coil from a PWM signal having a variable duty cycle whose magnitude produces a reduction in wheel slip.

13. The method of claim 8, further comprising the step of:
locating a coil in the clutch with respect to the location of the magnetic powder such that a magnetic field passes through the magnetic powder; and
wherein the step of adjusting the magnitude of the field strength further includes the step of producing electric current in the coil from a source of D.C. electric power whose magnitude produces a reduction in wheel slip.

14. The method of claim 8, wherein the step of adjusting the magnitude of the field strength, further includes the steps of:
adjusting a moveable permanent magnet whose location produces a reduction in wheel slip.

15. A system for controlling wheel slip of a motor vehicle having wheels, a steering angle and a steering direction, comprising:
a differential mechanism driven by a driveshaft, and including two rotating output shafts driveably connected to the wheels;
a clutch including a first element driveably connected to the first output shaft, a second element driveably connected to the second output shaft, a chamber at least partially bounded by the first element and second element, magnetic powder located in the chamber, an electromagnetic coil producing a magnetic field of variable strength passing through the chamber and magnetic powder and changing a capacity of the clutch to transmit torque between the first and second output shafts as the field strength changes;
sensors producing signals representing the speed of the output shafts, the steering angle, and the direction of the steering angle; and
a controller receiving as input the signals produced by the sensors, determining a target speed of the output shafts that corresponds to a driveshaft speed, steering angle and steering direction, comparing the speed of the output shafts and the target speeds to determine whether wheel slip is present, and adjusting the magnitude of the field strength to control the speed of the output shafts and reduce wheel slip.

16. The system of claim 15, further comprising:
means for reducing the magnitude of torque transmitted by the clutch in comparison to the magnitude of torque carried by the two output shafts.

17. The system of claim 15, further comprising:
a first control shaft driveably connected to the first element;
a second control shaft driveably connected to the second element;
a first torque reduction mechanism driveably connected to the first output shaft and first control shaft for reducing the magnitude of torque carried by the first control shaft in comparison to the magnitude of torque carried by the first output shaft; and
a first torque reduction mechanism driveably connected to the second output shaft and second control shaft for reducing the magnitude of torque carried by the second control shaft in comparison to the magnitude of torque carried by the second output shaft.

18. The system of claim 17, wherein:
the first torque reduction mechanism further comprises a pinion secured to the first output shaft, a gear secured to the first control shaft, driveably connected to the pinion and having a smaller diameter and fewer gear teeth than the pinion; and
the second torque reduction mechanism further comprises a second pinion secured to the second output shaft, a second gear secured to the second control shaft, driveably connected to the second pinion and having a smaller diameter and fewer gear teeth than the first pinion.

19. The system of claim 15, further comprising a controller causing an electric current to be applied to the coil, the current being in the form of a PWM signal having a variable duty cycle.

20. The system of claim 15, further comprising a controller causing an electric current to be applied to the coil, the current being in the form of a D.C. signal having a variable magnitude.

21. The system of claim 15, further comprising a controller causing an electric current to be applied to a moveable permanent magnet, the current being in the form of a d. c. signal that moves the magnet to cause a change in the magnetic field.

22. The system of claim 15, wherein the chamber has a relatively large width along a length of the first element and second element, and the chamber has a relatively narrow thickness between the first element and the second element.

23. The system of claim 15, wherein the chamber has a narrow thickness between the first element and the second element.

24. The system of claim 15, wherein the magnetic powder is in the form of gas-atomized, spherical particles of 410 low carbon stainless steel, the particles having a size in the range 1–250 microns.

25. The system of claim 15, wherein the magnetic powder is in the form of ferromagnetic particles.

26. A clutch for changing a magnitude of transmitted torque, comprising:
first and second rotating control shafts;
a first element driveably connected to a first control shaft;
a second element driveably connected to the second output shaft;
a chamber at least partially bounded by the first element and second element;
magnetic powder located in the chamber; and
an elecromagnetic coil producing a magnetic field of variable strength passing through the chamber and magnetic powder and changing a capacity of the clutch to transmit torque between the first and second control shafts as the field strength changes.

27. The clutch of claim 26, wherein the magnetic field of variable strength is produced by a permanent magnet.

28. The clutch of claim 26, wherein the magnetic field of variable strength is produced by a combination of a permanent magnet and an electromagnetic coil.

29. The clutch of claim 26, wherein the chamber has a relatively large width along a length of the first element and second element, and the chamber has a relatively narrow thickness between the first element and the second element.

30. The system of claim 26, wherein the chamber has a narrow thickness between the first element and the second element.

31. The system of claim 26, wherein the magnetic powder is in the form of gas-atomized, spherical particles of 410 low carbon stainless steel, the particles having a size in the range 1–250 microns.

32. The system of claim 26, wherein the magnetic powder is in the form of ferromagnetic particles.

* * * * *